(12) United States Patent
Subramanian et al.

(10) Patent No.: US 8,085,672 B2
(45) Date of Patent: Dec. 27, 2011

(54) WIRELESS ROUTING IMPLEMENTATION (75) Inventors: Dharmashankar Subramanian, New Hope, MN (US); Soumitri N. Kolavennu, Minneapolis, MN (US); Anoop Mathur, Shoreview, MN (US)

(73) Assignee: Honeywell International Inc., Morristown, NJ (US)

(*) Notice: Subject to any disclaimer, the term of this patent is extended or adjusted under 35 U.S.C. 154(b) by 1802 days.

(21) Appl. No.: 11/160,779

(22) Filed: Jul. 8, 2005

(65) Prior Publication Data
US 2006/0171344 A1     Aug. 3, 2006

Related U.S. Application Data (63) Continuation-in-part of application No. 10/905,971, filed on Jan. 28, 2005.

(51) Int. Cl.
*H04L 12/28* (2006.01)
(52) U.S. Cl. ......... 370/238; 370/252; 370/254; 370/400
(58) Field of Classification Search .......... 370/238–242, 370/237, 331, 225, 400
See application file for complete search history.

(56) References Cited

U.S. PATENT DOCUMENTS

| | | |
|---|---|---|
| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,614,945 A | 9/1986 | Brunius et al. |
| 4,812,785 A | 3/1989 | Pauker |
| 4,843,638 A | 6/1989 | Walters |
| 5,392,003 A | 2/1995 | Nag et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis et al. |
| 5,451,898 A | 9/1995 | Johnson |

(Continued)

FOREIGN PATENT DOCUMENTS

CH     673184     2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner* — Ricky Ngo
*Assistant Examiner* — Ben Liu
(74) *Attorney, Agent, or Firm* — Seager, Tufte & Wickhem LLC (57) ABSTRACT

A wireless communications system comprising a number of node devices and a base station, and having a routing calculator, wherein the system is operating with a first routing map, the routing calculator gathers data relating to communications between node devices and determines whether route improvement is indicated and, if so, the routing calculator generates an improved routing solution, and instructions are relayed via the first routing map to the node devices for implementing a new routing map generated from the optimized routing solution. Also, a method of operating a wireless communication system, including a base station and a number of node devices the method comprising determining whether system improvement is indicated, if so, generating an improved system configuration, distributing data related to the improved system configuration to the node devices, and replacing the current communication configuration with the improved system configuration.

19 Claims, 4 Drawing Sheets

U.S. PATENT DOCUMENTS

| | | | |
|---|---|---|---|
| 5,481,259 A | 1/1996 | Bane | |
| 5,642,071 A | 6/1997 | Sevenhans et al. | |
| 5,659,303 A | 8/1997 | Adair, Jr. | |
| 5,726,603 A | 3/1998 | Chawla et al. | |
| 5,767,664 A | 6/1998 | Price | |
| 5,809,013 A | 9/1998 | Kackman | |
| 5,847,623 A | 12/1998 | Hadjichristos | |
| 5,963,650 A | 10/1999 | Simionescu et al. | |
| 5,987,011 A | 11/1999 | Toh | |
| 6,052,600 A | 4/2000 | Fette et al. | |
| 6,058,137 A | 5/2000 | Partyka | |
| 6,091,715 A | 7/2000 | Vucetic et al. | |
| 6,175,860 B1 | 1/2001 | Gaucher | |
| 6,189,044 B1* | 2/2001 | Thomson et al. | 709/242 |
| 6,353,846 B1 | 3/2002 | Fleeson | |
| 6,366,622 B1 | 4/2002 | Brown et al. | |
| 6,401,129 B1 | 6/2002 | Lenander | |
| 6,414,963 B1 | 7/2002 | Gemar | |
| 6,624,750 B1 | 9/2003 | Marman et al. | |
| 6,768,901 B1 | 7/2004 | Osborn et al. | |
| 6,785,255 B2 | 8/2004 | Sastri et al. | |
| 6,823,181 B1 | 11/2004 | Kohno et al. | |
| 6,836,463 B2* | 12/2004 | Garcia-Luna-Aceves et al. | 370/238 |
| 6,836,506 B2 | 12/2004 | Anderson | |
| 6,901,066 B1 | 5/2005 | Helgeson | |
| 6,954,435 B2* | 10/2005 | Billhartz et al. | 370/252 |
| 7,007,102 B2* | 2/2006 | Billhartz et al. | 709/238 |
| 7,027,426 B2* | 4/2006 | Billhartz | 370/338 |
| 7,031,321 B2* | 4/2006 | Habetha | 370/395.31 |
| 7,035,207 B2* | 4/2006 | Winter et al. | 370/225 |
| 7,085,241 B1* | 8/2006 | O'Neill et al. | 370/254 |
| 7,280,483 B2* | 10/2007 | Joshi | 370/238 |
| 7,324,824 B2* | 1/2008 | Smith et al. | 455/456.1 |
| 7,397,771 B2* | 7/2008 | Nakasaku et al. | 370/254 |
| 7,512,074 B2* | 3/2009 | Strutt et al. | 370/238 |
| 7,522,537 B2* | 4/2009 | Joshi | 370/254 |
| 7,643,467 B2* | 1/2010 | Smith et al. | 370/351 |
| 2002/0011923 A1 | 1/2002 | Cunningham et al. | |
| 2002/0036987 A1* | 3/2002 | Garcia-Luna-Aceves et al. | 370/238 |
| 2002/0058502 A1* | 5/2002 | Stanforth | 455/422 |
| 2002/0085622 A1 | 7/2002 | Dhar et al. | |
| 2002/0141479 A1 | 10/2002 | Garcia-Luna-Aceves et al. | |
| 2003/0033394 A1* | 2/2003 | Stine | 709/222 |
| 2003/0053555 A1 | 3/2003 | McCorkle et al. | |
| 2003/0198280 A1 | 10/2003 | Wang et al. | |
| 2003/0204587 A1* | 10/2003 | Billhartz | 709/224 |
| 2004/0028023 A1 | 2/2004 | Mandhyan et al. | |
| 2004/0029553 A1 | 2/2004 | Cain | |
| 2004/0143842 A1* | 7/2004 | Joshi | 725/32 |
| 2004/0233882 A1* | 11/2004 | Park et al. | 370/338 |
| 2004/0253996 A1 | 12/2004 | Chen et al. | |
| 2004/0264372 A1* | 12/2004 | Huang | 370/230 |
| 2005/0007985 A1* | 1/2005 | Park et al. | 370/338 |
| 2005/0036486 A1* | 2/2005 | Sahinoglu et al. | 370/389 |
| 2005/0036616 A1* | 2/2005 | Huang et al. | 380/255 |
| 2005/0041591 A1 | 2/2005 | Duggi et al. | |
| 2005/0041627 A1* | 2/2005 | Duggi | 370/338 |
| 2005/0135330 A1* | 6/2005 | Smith et al. | 370/351 |
| 2005/0157698 A1* | 7/2005 | Park et al. | 370/351 |
| 2005/0281215 A1 | 12/2005 | Budampati et al. | |
| 2005/0286419 A1* | 12/2005 | Joshi et al. | 370/230 |
| 2006/0007882 A1* | 1/2006 | Zeng et al. | 370/328 |
| 2007/0147313 A1* | 6/2007 | Braam et al. | 370/338 |

FOREIGN PATENT DOCUMENTS

| | | |
|---|---|---|
| DE | 4344172 | 6/1995 |
| EP | 0607562 | 7/1994 |
| EP | 0893931 | 1/1999 |
| WO | WO 00/70572 | 11/2000 |

OTHER PUBLICATIONS

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bambooweb.com/articles/o/s/OSI_model.html, "Bambooweb OSI model," Bambooweb Dictionary, 5 pages, printed May 23, 2005.

http://www.dailywireless.org/modules.php?name=News &file=article&sid=871, "Location by Triangulation—Not," Daily Wireless, 2 pages, printed May 2, 2005.

http://www.unstrung.com/document.asp?site=unstrung&doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al. "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

* cited by examiner

WIRELESS ROUTING IMPLEMENTATION

CROSS REFERENCE TO RELATED APPLICATIONS

The present application is a continuation-in-part of U.S. patent application Ser. No. 10/905,971, entitled WIRELESS ROUTING SYSTEMS AND METHODS, which is incorporated herein by reference.

FIELD

The present invention is related to the field of wireless networking. More specifically, the present invention is related to wireless networking communication protocols and their implementation.

BACKGROUND

Wireless communication systems make use of routing protocols to move information from a first device to a second device. For such systems, there are often one or more base stations (various terms are used, including root node or gateway) that connect the wireless communication system to a second communication system. One example is an access point acting as the intermediary between a wireless system and a wired system. The other devices in the wireless system must determine how to route data to reach the base node.

Figure 1:
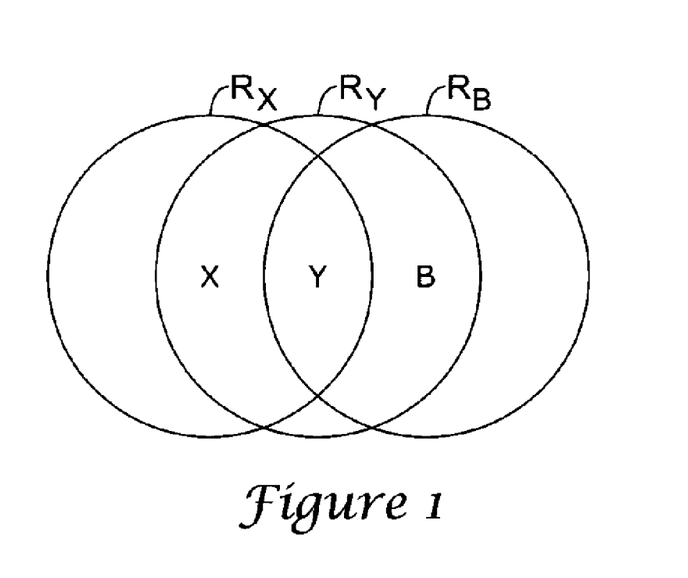
FIG. 1 is a diagram of a wireless network showing communication range.

Because the reliable transmission range of a device may not include the base node, routing strategies will often make use of intermediate devices. For example, as shown in FIG. 1, device X has a communication range RX, device Y has a communication range RY, and the base device B has a communication range RB. If only these three devices are included in the wireless network, the solution is simple: when X has data to send to B, X will send the data to Y, and Y will send the data to B. As more devices are added, however, the routing solutions become more complex.

SUMMARY

The present invention, in a first illustrative embodiment, includes a wireless communications system comprising a number of node devices and a base station wherein the system is operating with a first routing map, a route calculator is used to gather data relating to communications between pairs of node devices and determines whether routing improvement is indicated and, if so, the route calculator generates an improved routing solution, and instructions are relayed via the first routing map to the node devices for implementing a new routing map generated from the improved routing solution. The base station may be the route calculator or may include the route calculator as a software or hardware element. In some embodiments, the improved routing solution may be generated using a routing solution that is optimized in light of one or more factors.

In another illustrative embodiment, the present is embodied in a method of operating a wireless communication system, the wireless communication system including a base station and a number of node devices and operating with a current communication configuration using communication links between pairs of devices in the system. The illustrative method comprises determining whether system routing improvement is indicated, if so, generating an improved system configuration, distributing data related to the improved system configuration to the node devices, and replacing the current communication configuration with the improved system configuration.

DETAILED DESCRIPTION

The following detailed description should be read with reference to the drawings. The drawings, which are not necessarily to scale, depict illustrative embodiments and are not intended to limit the scope of the invention.

U.S. patent application Ser. No. 10/905,971, entitled WIRELESS ROUTING SYSTEMS AND METHODS, is incorporated herein by reference. Some of the methods set forth in the Ser. No. 10/905,971 patent application allow for benchmarking of an existing communication system and the existing system's communication protocols/routes. Data related to the existing system connections and communication routes may be gathered, and an improved network solution may then be generated for comparison to the existing system. Metrics for the existing and improved system solution may be generated and compared. Then, it may be determined whether reconfiguration using a centrally generated communication protocol is appropriate. The present invention includes, in some embodiments, implementation of the newly generated solution. In some embodiments, the improved solution may be optimized in light of one or more factors related to communications security, efficiency and/or reliability.

In an illustrative embodiment, a wireless network having a number of devices is provided. Poor data routing can increase the response time of such networks, and makes such networks vulnerable to over-reliance on a limited number of devices. For example, if data is routed heavily through one or two nodes, then these nodes may form bottlenecks for data movement to the base station, causing delays. Furthermore, failure of heavily used nodes can lead to heavy data losses.

Design and selection of data routing within such networks is rendered complicated due to their distributed nature, even when the data routing takes place within a network having static (non-moving) devices. At any given time, one or more devices that are a part of the network may, for whatever reason, lose connectivity to the rest of the network. For example, a flurry of local noise can block communication with a device, or a device may periodically enter a low power sleep mode. Further, it is often desirable to have a network enabled for adding devices after initial setup.

One result of these various difficulties is that centralized configuration of data routing is rendered laborious. For example, a centralized configuration may require updating when a device is permanently or temporarily added or removed. Updating a centralized configuration may require contacting each device in the network separately. These difficulties make decentralized configuration a desirable feature during ongoing operation. However, it has been found in simulation that decentralized configuration often fails to produce results that are as efficient as centralized configuration.

For purposes herein, routing solutions may be described as improved when the efficiency of system communication is better, using an objective standard, than a previous solution. For example, an improved solution may have fewer data hops in its total routing map than another solution. There are several factors that may be selected, for example, the number of hops, node latency, and received signal strength indicators. Further, these factors may be considered in several manners, including average or median system levels, maximum levels, logarithmic summation, or the like. As such, selection of a particular factor and a particular manner of analyzing that factor may vary. Some improved solutions may be optimized solutions making use of one or more such factors. For example, as set forth in copending U.S. patent application Ser. No. 10/905,971, a number of factors may be considered as a weighted sum, wherein linear programming methods can be used to find a solution that is optimized for the factors considered. Such optimization may have multiple tiers: which factors that are considered; the format in which each factor is considered; and the weight given to the various factors.

Several of the following illustrative examples refer to the inclusion of a routing calculator. It should be understood that a routing calculator may be embodied as a portion of software or other instruction set, or within hardware, if desired, in any node of a communication network, including the base node. Further, a routing calculator may also be embodied in a separate device normally not part of a communication network, for example, as part of a configuration, updating, or optimization device.

Figure 2:
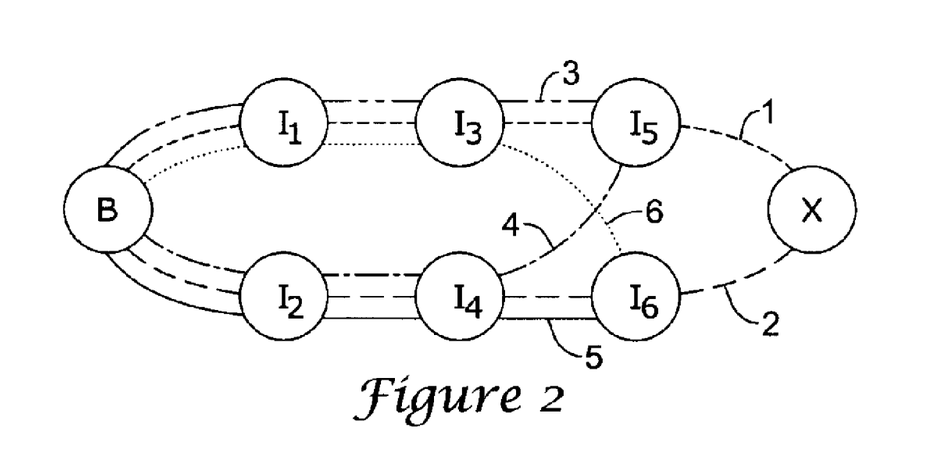
FIG. 2 is a diagram of redundant, non-overlapping routes in a wireless network.

FIG. 2 is a diagram of redundant, non-overlapping routes in a wireless network. The network is shown including a base station B, and several nodes I1 . . . I6 and X. In the illustrative embodiment, the aim is to provide robust communication between each device and the base station B. Defining non-overlapping redundant routes is one way of achieving such a goal. A first route 1 is defined between X and B, going through the odd-numbered nodes I5, I3, and I1. A second route 2 is defined between X and B, going through the even-numbered nodes I6, I4, and I2. The two routes 1, 2 do not overlap, and are therefore redundant, non-overlapping routes. Additional routes going from any node to any other node may be defined as well, and not just between nodes and the base station. Routes are generally directed or addressed to a destination node, and a base station is merely one of several possible destination nodes in some systems.

Also shown are additional routes to create redundancy from node I5 to B. A first route follows route 1 and is denoted route 3, and another route for I5 follows route 4, through nodes I4 and I2. Likewise for node I6, route 5 follows part of route 2, and route 6 goes through nodes I3 and I1. As can be seen, even with relatively few nodes or devices, the number of paths grows quickly, especially when non-overlapping redundant paths are desired. In some embodiments, device X is a device operating in similar fashion to the other node devices I1 . . . I6. In other embodiments, for example as further illustrated below in FIG. 6, device X may instead be a different type of device than the node devices. For example, some node devices may be full function devices (FFD), while device X may be either an FFD or a reduced function device (RFD), depending upon the application.

Figure 3:
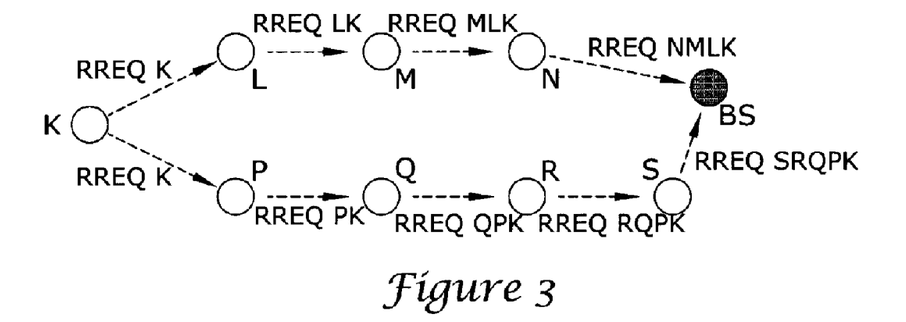
FIG. 3 is a diagram illustrating decentralized configuration of routes for a device A.

FIG. 3 is a diagram illustrating decentralized configuration of routes for a device K. In the illustrative embodiment, K may be a newly added device to a system already having other devices L, M, N, P, Q, R, S, and base station BS. Device K may also be a device which was part of the system, but is reestablishing contact with the system, for example, after a low power sleep period or after a period of interference (noise) preventing contact. Device K may also be reconfiguring itself in light of a command to reconfigure routing, for example, after other devices have been added to or removed from the system.

Decentralized configuration to add K may take place as follows. K generates a routing request RREQ, followed by its own address, K, making message "RREQK". When nearby devices L, P receive the routing request from K, each will retransmit the message, after including its own address in the message. Other information, for example, RSSI data (received signal strength indicators), other link quality data, or node latency data (in the illustrative embodiment, the node latency is proportional to the number of routes serviced by the node) may also be added. Node latency data may take any suitable form. In another example, node latency data may be generated by having several or each node maintain statistics on the residence time of data (or packets of data) at that node. In a further example, the latency value for each node may be the mean residence time, or another statistic or metric related to the set or distribution of residence times. To accommodate for intermittent communication failures that may occur, for example, where a device is not always "ON" (e.g. occasionally enters sleep mode), the gathered data may include indicators of communication link failures and the frequency of such failures.

The message is then repeated until the RREQ reaches the destination, in this case, the base station BS. As shown, the base station may receive more than one RREQ from K—in this case, RREQNMLK passes through nodes L, M, and N after it is generated by K and before it is received at BS. Likewise, RREQSRQPK passes through nodes P, Q, R, and S after it is generated and before it is received at BS. The base station BS will then sort through the messages and select the apparently best route. Typically, the "best" route will be determined as the one having the best link strength and the least number of hops. Other factors that may be considered in having the base station select the best route include the "load" of any of the intermediate nodes between K and BS. For example, a route including a high load intermediate node (a node that already forms a part of a large number of other existing routes) may be deselected to avoid data collisions at the high load node.

After BS selects the "best" route (or two or more best routes, in some embodiments), a message is generated by BS and addressed to K for the purpose of indicating, to K, what route(s) should be used. In some embodiments, the base station BS is enabled for broadcasting to all other nodes, such that the message can be sent by BS directly to K. In other embodiments, BS may route the message to K using intermediate devices. The decentralized configuration can typically be performed without significantly interfering with communications within the network, as other, existing communication routes may remain the same when the new device is added.

It can be seen in FIG. 3 that two non-overlapping, redundant paths have been defined for K to reach the base station BS. One path follows the series K-L-M-N-BS. The other path follows the series K-P-Q-R-S-BS. These paths have different lengths, often described as having different numbers of hops. The maximum load carried by any one of the intermediate stations (L, M, and N in one instance, P, Q, R, and S in the other) may be different from one route to the next. Each link in the path may have a different signal strength. Each node in the path may carry a different load insofar as the number of routes passing therethrough is concerned. Each of these factors can affect system performance, for example, by changing the amount of time needed for data to reach BS, or how a route affects other routes used in the system.

Figure 4:
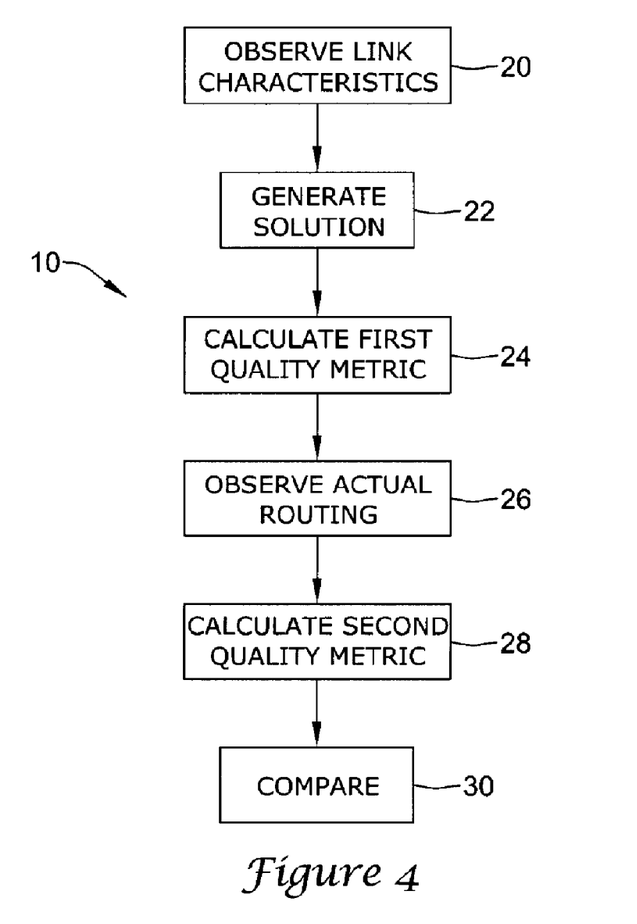
FIG. 4 is a flow chart for an example routing improvement method.

FIG. 4 is a flow chart for an illustrative method of analyzing system performance to determine whether improvement and/or optimization is indicated. The method 10 begins by observing link characteristics among links in an existing wireless system, as shown at 20. The existing system may be, for example, one in which at least some nodes have been added and provided communications routes in a decentralized manner. In another step, an improved solution is generated, as shown at 22.

In an illustrative embodiment, the improved solution is generated by a process of a mixed integer linear program, as set forth further in copending U.S. patent application Ser. No. 10/905,971. In the illustrative embodiment, the one or more factors are then used to generate a first quality metric, as shown in FIG. 4 at step 24, from the improved solution. This metric may be, for example, a number. Next, the actual routing characteristics of the system are observed, as shown at 26. A second quality metric is generated as shown at 28, making use of the actual routing characteristics. Finally, the first and second quality metrics are compared, as shown at step 30.

For the illustrative system, reconfiguration may take place when the comparison of the first and second quality metrics indicates reconfiguration with result in a desired gain. For example, if the first quality metric is less than a preselected percentage (for example, 75%, or any other value) of the second quality metric, a corresponding level of improvement (e.g. 25%) may be expected from reconfiguration, such that the computational and communication expense required for implementing reconfiguration is justified.

This method may take place by operation of a route calculator. The route calculator may be a software or hardware function of a base station, one of the nodes in the communication system, or a completely separate device.

In an illustrative method, the infrastructure nodes are characterized in terms of their physical characteristics, including relative juxtaposition and link strength between nodes. A graph may be defined G (V, E) in which the vertex set is the set of all nodes, including the base station. The edges of the graph are directed edges that denote communication connectivity between vertices. For example, if there is a directed edge between a vertex A and a vertex B, then there is communication possible from A to B. Then the two (or more) best non-overlapping paths to the base station are chosen. A graphical analysis taking into consideration the factors noted above (and/or other factors, as desired) allows an optimal solution (with respect to the selected factors and/or weights) to be approached.

Figure 5:
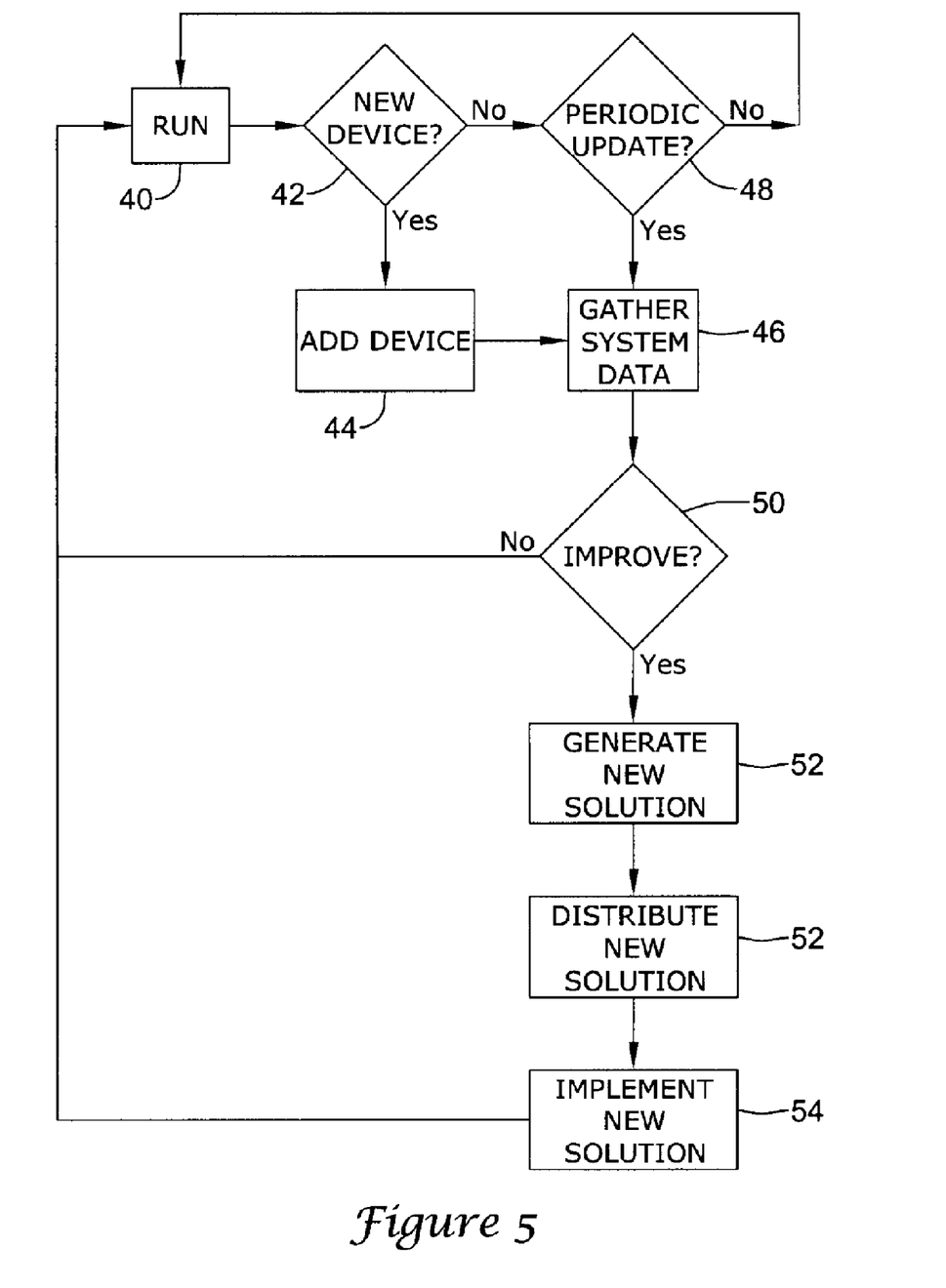
FIG. 5 is a flow chart for an illustrative embodiment.

FIG. 5 shows, in block form, an illustrative method of implementing an improved routing configuration. The method shown in FIG. 5 may, again, take place by operation of a route calculator. The route calculator may be a software or hardware function of a base station, one of the nodes in the communication system, or a completely separate device.

The method begins with the system in a run state 40, where normal communications take place between a number of nodes as well as a base node. From time to time, a check for new devices 42 is performed. If a new device is detected in the system, the method continues by going through a routine for adding a new device, as shown at 44. The routine may be any suitable device adding routine including, for example, the decentralized routine explained above with reference to FIG. 3. After a new device is added at 44, the method goes into an improvement routine which begins by gathering system data, as shown at 46. If there is no new device as shown at 42, the method may include checking whether it is time for a periodic update of the system configuration, as shown at 48. If so, the method goes, again, to an improvement routine beginning by gathering system data, as shown at 46. If not, control passes back to the run state 40.

Using the system data, the method may determine whether improvement is appropriate or needed, as shown at 50. For example, the methods discussed in copending U.S. patent application Ser. No. 10/905,971 may be used to determine whether improvement is appropriate. If improvement is not appropriate, the method returns to the run state 40.

If improvement is appropriate, the method continues by finalizing the improved solution, as shown at 52. Any suitable factors may be used for generating an improved solution. For example, a scaled product of node latencies and average signal strength may be a metric that is optimized to find an improved solution. In another example, a combination of scaled metrics related to node latency, path length, link quality, and maximum node loads may be considered and optimized.

Given the improved solution, the next step is to distribute the new solution, as shown at 52. The new solution may be distributed using existing communication mapping or path definitions. Alternatively, the new solution may be distributed by a broadcast signal, for systems enabled with such capability. In some embodiments, the existing or "old" solution is used until the new solution can be distributed to the network nodes. Once so distributed, the next step is to implement the new solution, as shown at 54, by replacing old routing maps, preferences, and/or addressing protocols related to the old route map with elements configured for the new solution.

As shown in the method of FIG. 5, the illustrative method adopts an approach wherein the first manner of adding a new device is via a decentralized method wherein the new device transmits a message which traverses the network to the base node, and the routing table is simply updated using the best available route(s) discovered. In some embodiments, the "best" available route will be defined using additional factors. For example, when several new devices are added in a short period of time, a preference may be given to using the newly added devices for hops toward the base node, rather than reusing existing routes. This may be performed to the greatest extent possible, in some embodiments. In another example, new devices may be added such that several hops are available to reach a device among the new devices which is "closest" to the base node (in terms of selected factor(s) such as number, quality, latency, etc. of communication hops); communications from the other new devices may be routed to the "closest" node device, and from there through other existing routes.

Within the context of the present invention, a centralized approach to routing can be considered as a category of improved solutions. Because there are several factors involved in creating the "optimum" approach, it should be understood that there is, in reality, rarely a single "optimal" routing approach. There are, instead, improved communication solutions which may be optimized in terms of one or more factors related to communication quality.

Figure 6:
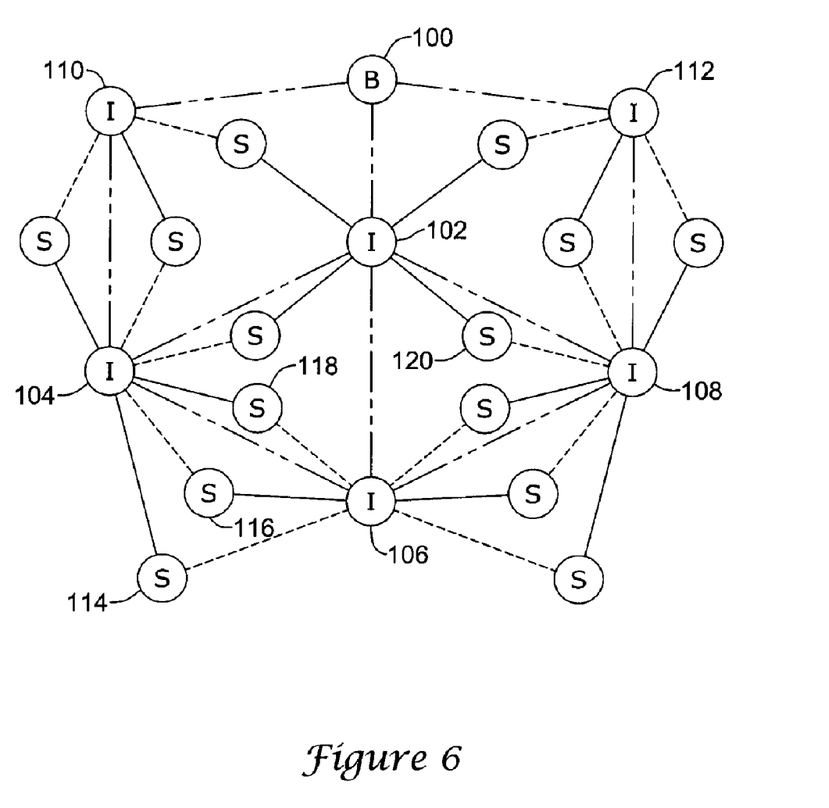
FIG. 6 illustrates an example wireless sensor network.

FIG. 6 illustrates an example wireless sensor network. The network includes a gateway node or base node 100, a number of infrastructure nodes 102, 104, 106, 108, 110, 112, and a number of leaf nodes shown as sensors S. In the illustrative example, each sensor associates itself with two infrastructure nodes, such that failure of any one infrastructure node will not entirely disconnect a sensor from the network. In some embodiments, the network takes a form as described in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, the disclosure of which is incorporated herein by reference. In other embodiments, the sensors S may be considered reduced function devices (RFD), while the infrastructure nodes 102, 104, 106, 108, 110, 112 are considered full function devices (FFD). The RFD and FFD devices may also interact in accordance with other protocols, for example, the Zigbee protocol which is based on IEEE 802.15.4.

In one embodiment, at least some of the sensors operate in low power modes. For example, a given sensor may have an active mode and a low power sleep mode, wherein the sensor periodically wakes from low power sleep to transmit data using the active mode. While in low power sleep, the sensor is unavailable for communications. At a scheduled time, the sensor may awaken, and transmits whatever data it has gathered for transmission to an associated infrastructure node. Next, the infrastructure node may transmit the sensor data to the base station.

For the purposes of redundancy, a sensor may transmit to two infrastructure nodes. For example, several sensors 114, 116, 118 are shown associated with each of infrastructure nodes 104, 106. In some embodiments, the system is configured such that routes for signals from these sensors 114, 116, 118 which pass through the infrastructure nodes 104, 106 are non-overlapping. For example, a signal from a first sensor 114 may be routed to infrastructure nodes 104 and 110, and then to the base node 100, and also to infrastructure nodes 106 and, and then to the base node 100. Meanwhile a signal from a second sensor 116 may have the same pair of routes. It can be seen from the system shown that node 102 is likely to be used for a number of sensor transmissions. To reduce the overall latency of the system, some data that could be routed through node 102 may be routed around node 102. Thus, data from a sensor such as sensor 118 may be routed to infrastructure nodes 104 and 110, and then to the base node 100, as well as around node 102 by passing to nodes 106, 108, and 112 before going to the base node 100.

To highlight one of the difficulties that can arise with a decentralized approach to routing, suppose a sensor 120 is added to the system. As can be seen, sensor 120 is placed such that association with nodes 102 and 108 is desirable. Sensor 120 may be close enough for communication with node 106 as well, but is clearly closer to node 102. However, if sensor 120 is the newest sensor added to the system, then node 102 may already be carrying the heaviest routing load of the system. If node 102 is already at its capacity for routing load, then node 102 would be unavailable for routing signals from sensor 120. This would require sensor 120 to associate with nodes 106 and 108, and signals passing from sensor 120 to node 106 would be retransmitted to nodes 104 and 110 before reaching the base node 100. The result is inefficient. However, reconfiguring the entire routing table every time a new sensor is added, every time a sensor is removed, every time a sensor loses communication with its associated infrastructure nodes, and every time a sensor that has lost communication regains communication, as well as other times when infrastructure nodes are added and removed, or lose and regain communication, would likely create a cacophony of routing configuration signals. Therefore, with the present invention, an improved solution can be implemented when needed, as determined illustratively in the method shown in FIG. 5.

When actual performance falls below a desired threshold, then the system can be reconfigured in either a centralized or decentralized manner. For example, if metrics are generated as explained above with reference to FIG. 4, and if the actual system metric indicates a score which is worse than the improved score by a predetermined amount, then the system may be reconfigured. As used herein, such a decision can be characterized as a finding that reconfiguration is indicated by the communication system characteristics.

Any of the devices in the system may be programmed to perform analysis related to the present invention. For example, the base station may perform the analysis. Alternatively, a separate device may be communicatively coupled to the system for performing such analysis. If desired, a base station may gather system performance data and transmit the data to another device that is not part of the system (for example, a device accessible using a wired network accessible by the base station). Because an improved solution may require extra computing capacity, the ability to transmit performance data to a separate device out of the system may aid in allowing system analysis to occur even while the system is operating.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A wireless communication system comprising a number of node devices and at least one base station, wherein a first routing map of the communication system is generated at least in part using a decentralized method, the communication system further including a centralized route calculator for generating routing maps for the communication system using a centralized method, wherein while the system is operating with the first routing map, the centralized route calculator gathers data relating to communications between node devices and determines whether route improvement is indicated and, if so, the centralized route calculator generates an improved routing solution, and instructions are relayed for implementing a new routing map generated from the improved routing solution.

2. The system of claim 1 wherein the base station includes the centralized route calculator, and the base station relays instructions to the node devices for implementing the new routing map generated from the improved routing solution.

3. A wireless communication system comprising a number of node devices and at least one base station, a centralized route calculator being associated with the communication system for generating routing maps using a centralized method, wherein while the system is operating with a first routing map, the centralized route calculator gathers data relating to communications between node devices and determines whether route improvement is indicated and, if so, the centralized route calculator generates an improved routing solution, and instructions are relayed using the first routing map to the node devices for implementing a new routing map generated from the improved routing solution; and wherein when a new node is added, a decentralized method of determining at least one communication route between the new node and a destination node is used to add the new node to the new routing map.

4. The system of claim 3 wherein at least first and second non-overlapping routes are determined between the new node and the destination node.

5. The system of claim 1 further comprising a new node, wherein when the new node is added to the communication system, a decentralized method of determining at least one communication route between the new node and a destination node is used to add the new node to the new routing map.

6. The system of claim 1 wherein some of the nodes are full function devices and other nodes are reduced function devices.

7. The system of claim 6 wherein first and second non-overlapping routes are defined between reduced function devices and a destination node.

8. The system of claim 6 wherein first and second non-overlapping routes are defined between full function devices and a destination node.

9. The system of claim 1 wherein the improved routing solution is an optimized solution created by optimizing the system in light of a set of two or more factors related to communication efficiency.

10. The system of claim 1 wherein the improved routing solution is an optimized solution created by optimizing the system in light of a set of two or more factors related to communication reliability.

11. The system of claim 5 wherein the centralized route calculator performs the steps of gathering data relating to communications between pairs of node devices and determining whether route improvement is needed repeatedly, including after the new node is added.

12. A method of operating a wireless communication system, the wireless communication system comprising a base station and a number of node devices, the method comprising:
   operating the communication system with a current communication configuration using communication links between devices in the system, wherein the current communication configuration is generated at least in part using a decentralized method;
   determining whether system improvement is indicated using a centralized route calculator, and if so:
      generating an improved system configuration with the route calculator using a centralized route calculation algorithm;
      distributing data related to the improved system configuration to the node devices;
      replacing the current communication configuration with the improved system configuration.

13. The method of claim 12 wherein the current communication configuration includes a plurality of communication routes connecting each of the node devices to one or more destination nodes, wherein for each node device there are at least first and second redundant, non-overlapping paths defined between the node device and a destination node.

14. The method of claim 12 further includes adding a new device to the system, wherein a decentralized method is used for determining at least one communication route between the new device and a destination device, and wherein the step of determining whether system improvement is indicated is repeated after the new device is added to the system.

15. The method of claim 12 wherein the step of determining whether system improvement is indicated is performed repeatedly.

16. The method of claim 12 wherein the step of determining whether system improvement is indicated includes observing characteristics of communication links between devices in the system to determine a quality of the current communication configuration, estimating a quality of the improved communication configuration for the system, and comparing the quality of the current communication configuration to the estimated quality of the improved communication configuration.

17. The method of claim 16 wherein the improved communication configuration is optimized in light of a set of two or more factors related to communications reliability.

18. The method of claim 16 wherein the improved communication configuration is optimized in light of a set of two or more factors related to communications efficiency.

19. A node device for use in a wireless communication system comprising a centralized route calculator and a number of node devices, the node devices configured to perform the following operations:
   determining whether the node device is configured with a route for addressing messages to a destination node in the system; and, if not, entering a discovery protocol sequence including:
      a) generating a discovery route to the destination node using a decentralized method;
      b) exiting the discovery protocol sequence and routing future messages to the destination node using the discovery route;
   indicating communication characteristics for links reachable by the node device to the centralized route calculator; and
   receiving, when not in the discovery protocol sequence, a routing message from the centralized route calculator generated using the communications characteristics indicating a planned communication route to the destination node and routing future messages to the destination node using the planned communication route.

* * * * *